US012477003B2

(12) United States Patent
Tushkanov

(10) Patent No.: US 12,477,003 B2
(45) Date of Patent: Nov. 18, 2025

(54) SYSTEM AND METHOD OF CREATING A CLASSIFIER FOR DETECTING PHISHING SITES USING DOM HASHES

(71) Applicant: AO Kaspersky Lab, Moscow (RU)

(72) Inventor: Vladislav N. Tushkanov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 80 days.

(21) Appl. No.: 18/607,721

(22) Filed: Mar. 18, 2024

(65) Prior Publication Data
US 2024/0380783 A1 Nov. 14, 2024

(30) Foreign Application Priority Data

May 12, 2023 (RU) .......................... RU2023112277

(51) Int. Cl.
H04L 29/06 (2006.01)
G06F 16/958 (2019.01)
G06N 20/00 (2019.01)
H04L 9/40 (2022.01)

(52) U.S. Cl.
CPC ........ *H04L 63/1483* (2013.01); *G06F 16/986* (2019.01); *G06N 20/00* (2019.01)

(58) Field of Classification Search
CPC .... H04L 63/1483; G06F 16/986; G06N 20/00
See application file for complete search history.

(56) References Cited

U.S. PATENT DOCUMENTS

| 9,497,218 | B1* | 11/2016 | Davydov | ............ H04L 63/1483 |
| 2020/0204587 | A1* | 6/2020 | Hunt | ..................... G06F 21/128 |
| 2020/0252428 | A1* | 8/2020 | Gardezi | ............. H04L 63/1416 |

* cited by examiner

Primary Examiner — Wasika Nipa
(74) Attorney, Agent, or Firm — ArentFox Schiff LLP; Michael Fainberg

(57) ABSTRACT

Disclosed herein are systems and methods for creating a classifier for detecting phishing sites using Document Object Model (DOM) hashes. In one aspect, an exemplary method comprises: parsing each page of the website, wherein the parsing includes at least generating a DOM tree of the page, for each page, generating at least one string of DOM tree elements according to predetermined patterns, creating a first hash based on the string, creating a second hash for the page, generating a first dataset comprising hashes of safe pages and a second dataset comprising hashes of phishing pages, analyzing the first and second datasets to determine whether there is diversity of data in each dataset, generating a training sample from the datasets when there is diversity of data, and training a classifier of a machine learning model based on the training sample generated from the first and second datasets.

17 Claims, 8 Drawing Sheets

501

```
<html>
  <head>
    <title></title>
  </head>
  <body>
    <h1 class="header"></h1>
  </body>
</html>
```

Line 1: doc|html|head|title|/title|/head|body|h1|/h1|/body|/html|/doc

Line 2: doc|html|head|title|/title|/head|body|h1:class|/h1|/body|/html|/doc

Fig. 5B

| Hash | Hash Type | Training Action | Decision |
|---|---|---|---|
| d096ef8efaecff8b34921c769bb5cd3f | hash_full | mark_as_trash | mark_as_clean |
| 62ff2e4409d20bd40f4fb5cb9c83948e | hash_full | none | mark_as_phish |
| 68b329da9893e34099c7d8ad5cb9c940 | content_md5 | mark_as_trash | mark_as_clean |
| 0ea4ffc9d012b04331651595409aa9bc | hash_full | mark_as_trash | mark_as_clean |
| a256c7a920f7bc8b7681a74d6d361425 | hash_full | mark_as_trash | mark_as_clean |
| 1e9fe9477ec3def64c3d1023f81f808 | hash_full | mark_as_trash | mark_as_clean |
| 91b665be5d4e00a3f7228a13fe26e9d63 | hash_full | mark_as_trash | mark_as_clean |
| 82954787c46b3bb97f11708eaba9a46d | hash_full | none | mark_as_phish |
| c83748a5dfb5c7d806259ae01a347114 | hash_full | mark_as_trash | mark_as_clean |
| f25e8d37f6c359bd903967fede7fa5d5 | hash_full | none | mark_as_phish |

Suspicious page 1

701

```
<html>
  <head>
    <title>Totally Legitimate Banking Site</title>
  </head>
  <body>
    <h1 class="header">Login</h1>
  </body>
</html>
```

Suspicious page 2 (with spoofing)

702

```
<html>
  <head>
    <title>Tota11y L3g1t1mat3 Bank1ng S1t3</title>
  </head>
  <body>
    <h1 class="header kavwinwin">Log1n</h1>
  </body>
</html>
```

SYSTEM AND METHOD OF CREATING A CLASSIFIER FOR DETECTING PHISHING SITES USING DOM HASHES

CROSS REFERENCE TO RELATED APPLICATIONS

The present application claims priority to Russian Patent Application No. RU2023112277, filed on 12 May 2023, the entire content of which is incorporated herein by reference.

FIELD OF TECHNOLOGY

The present disclosure relates to the field of information technology, and more specifically to systems and methods for creating and training a classifier to detect phishing sites, and for optimizing the detection of phishing sites.

BACKGROUND

Over the past decade, computer attacks involving imitation of the websites of popular companies, such as phishing attacks, have become a big problem faced by many Internet users. Phishing is a type of Internet fraud aimed at gaining access to confidential user data, in particular logins and passwords. This is achieved by sending mass emails on behalf of popular brands, as well as private messages within various services, for example, on behalf of banks or within social networks. The email often contains a direct link to a site that looks indistinguishable from a legitimate site, or to a site with a redirect. After the user lands on the fake page, the attackers try to induce the user to enter their username and password on the fake page, which they use to access a certain site, which allows the attackers to gain access to the user's accounts and/or bank accounts.

As usage of online transactions grows, there are more and more ways of stealing sensitive user data. For example, some phishers use JavaScript to modify the address bar. This is achieved, for example, by executing a so-called browser-in-the-browser (BitB) attack, in which an attacker uses HTML to create a fake browser window directly on a website page.

In another example, attackers can also exploit vulnerabilities in the scripts of a trusted site. This type of scam, known as Cross-Site Scripting, is most dangerous because the user is interacting with an official (trusted) site. A cross-site scripting attack is the injection of malicious code into the content of a trusted site and subsequent operation of the malicious code in dynamic content displayed in the user's (victim's) browser. Such phishing is very difficult to detect without special skills.

There are many solutions aimed at detecting cyberattacks using fraudulent sites. However, these approaches take extensive time to make a decision and require processing of a large amount of information. In addition, the sheer volume of information presented on the internet is also a challenge for fast and efficient website monitoring and analysis. For example, in the process of processing a flood of phishing URLs, namely when HTML pages that correspond to them are downloaded, instead of a real phishing page, they potentially receive a lot of typical information, for example: messages that these pages have already been blocked; various server errors if the page is blocked or deleted by the administrator; typical cloaking, i.e. a method of deceiving search engines and automated analysis systems. The amount of such data can be quite large.

Thus, one of the disadvantages of the existing approaches is the increase in the analysis time with a large amount of data and the impossibility of making a decision in case of incomplete compliance of the code when comparing the injected code with other codes. One approach for addressing this disadvantage is to use machine learning models to speed up the processing of large amounts of information. For example, content processors and derived technologies based on machine learning may be used. However, the quality of the result is extremely dependent on the quality of training data. Practice has shown that it is this type of information that prevents one from achieving a high quality of detection of a real phishing attack. First, the machine learning model learns to detect things that are easy to detect but don't need to be detected, for example, because those pages are already blocked, rather than really sophisticated phishing pages. Secondly, there is an increased likelihood of false positives due to getting into phishing samples of safe (legitimate) HTML pages.

Therefore, there is a need for a method and a system for improving and optimizing the detection of phishing sites. That is, there is a need for a method and system of for improving the detection of changes or similarities and detection of phishing sites, while reducing false positives and increasing the rate of true positives.

SUMMARY

Aspects of the disclosure relate to systems and methods for creating a classifier for detecting phishing sites using Document Object Model (DOM) hashes and for optimizing the detection of phishing sites. The method and system of the present disclosure are designed to reduce the number of false positives and increase the proportion of true positives in detecting phishing sites using a database of Document Object Model (DOM) tree hashes for pages.

In one exemplary aspect, a method for creating a classifier for detecting phishing sites using Document Object Model (DOM) hashes is disclosed, the method comprising: parsing each page of one or more pages of the website, wherein the parsing of the page includes at least generating a DOM tree of the page; for each page of the one or more pages, generating at least one string of DOM tree elements according to one of more predetermined patterns; for each page of the one or more pages, creating a first hash based on the string of the generated at least one string, and creating a second hash for the page; generating a first dataset comprising hashes of safe pages and a second dataset comprising hashes of phishing pages; analyzing the first dataset and the second dataset to determine whether there is a diversity of data in each dataset; generating a training sample from the datasets when there is a diversity of data in each of the first dataset and the second dataset; and training a classifier of a machine learning model based on the training sample that is generated from the first dataset and the second dataset.

In one aspect, the page is obtained by at least one of: from a database; and from a website by downloading pages of the website based on a set of Universal Resource Locators (URLs) associated with one or more sources.

In one aspect, a pattern of the one or more predetermined patterns defines how the string is formed from elements of the DOM tree of the page using a template.

In one aspect, the at least one pattern comprises at least one of the following: a first pattern that generates a string based on tag names in the DOM tree of the page; and a second pattern that generates a string based on tag names and tag attribute names.

In one aspect, at least two strings are generated, a first string being generated from the first pattern and a second string being generated from the second pattern.

In one aspect, the generating of the first dataset comprising hashes of safe pages and the second dataset comprising hashes of phishing pages further comprises: whether there are groups of similar hashes in the respective datasets, wherein the groups of similar hashes are sufficiently large.

In one aspect, the analyzing of the first dataset and the second dataset to determine whether there is a diversity of data in each dataset further comprises: cleansing the first dataset and the second dataset, wherein the cleansing includes removing hashes from one of the first dataset or the second dataset hashes that have been found in both the first dataset and the second dataset.

In one aspect, the method further comprises: rechecking the diversity of data in each dataset after the cleansing.

In one aspect, the method further comprises: testing the trained classifier on a subset of data dedicated for testing.

In one aspect, the classifier is retrained when a false positive is detected during validation on the subset of data dedicated for testing.

According to one aspect of the disclosure, a system is provided for creating a classifier for detecting phishing sites using Document Object Model (DOM) hashes, the system comprising at least one memory; and at least one hardware processor coupled with the at least one memory and configured, individually or in combination, to: parse each page of one or more pages of the website, wherein the parsing of the page includes at least generating a DOM tree of the page; for each page of the one or more pages, generate at least one string of DOM tree elements according to one or more predetermined patterns; for each page of the one or more pages, create a first hash based on the string of the generated at least one string, and create a second hash for the page; generate a first dataset comprising hashes of safe pages and a second dataset comprising hashes of phishing pages; analyze the first dataset and the second dataset to determine whether there is a diversity of data in each dataset; generate a training sample from the datasets when there is a diversity of data in each of the first dataset and the second dataset; and train a classifier of a machine learning model based on the training sample that is generated from the first dataset and the second dataset.

In one exemplary aspect, a non-transitory computer-readable medium is provided storing a set of instructions thereon for creating a classifier for detecting phishing sites using Document Object Model (DOM) hashes, wherein the set of instructions comprises instructions for: parsing each page of one or more pages of the website, wherein the parsing of the page includes at least generating a DOM tree of the page; for each page of the one or more pages, generating at least one string of DOM tree elements according to one of more predetermined patterns; for each page of the one or more pages, creating a first hash based on the string of the generated at least one string, and creating a second hash for the page; generating a first dataset comprising hashes of safe pages and a second dataset comprising hashes of phishing pages; analyzing the first dataset and the second dataset to determine whether there is a diversity of data in each dataset; generating a training sample from the datasets when there is a diversity of data in each of the first dataset and the second dataset; and training a classifier of a machine learning model based on the training sample that is generated from the first dataset and the second dataset.

The method and system of the present disclosure are designed to improve the detection of phishing sites. The technical result of the present method is to reduce the false positive rate and increase the true positive rate by generating a classifier that includes a machine learning model for detecting phishing sites using DOM hashes for pages.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 5a illustrates an exemplary of a DOM tree for a site page in accordance with aspects of the present disclosure.

FIG. 5b illustrates an example of string generation from a DOM page object in accordance with aspects of the present disclosure.

FIG. 6 illustrates an example of a database containing classified hash functions of site pages for training a machine learning model in accordance with aspects of the present disclosure.

FIG. 7 illustrates an example of using the method of the present disclosure to identify suspicious pages in accordance with aspects of the present disclosure.

DETAILED DESCRIPTION

Exemplary aspects are described herein in the context of a system, method, and a computer program for creating a classifier for detecting phishing sites using Document Object Model (DOM) hashes in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Figure 8:
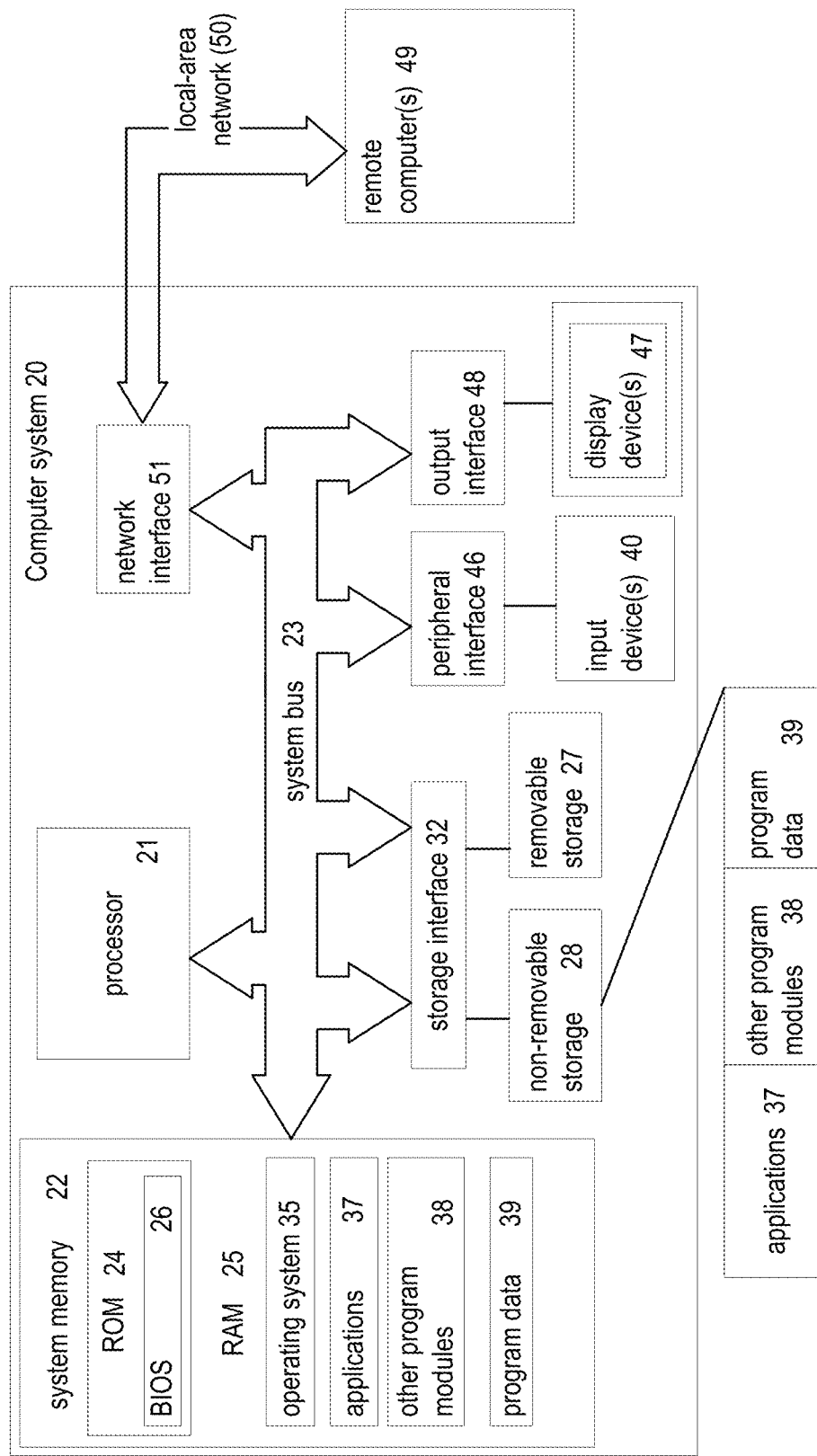
FIG. 8 presents an example of a general purpose computer system on which aspects of the present disclosure for creating a classifier for detecting phishing sites using DOM hashes can be implemented.

In some aspects of the present disclosure, some or all of the system for creating a classifier that includes a machine learning model for detecting phishing sites, or some or all of a system for detection of phishing sites that includes a retrainer of a classifier may be implemented on the processor of a general-purpose computer (which, for example, is depicted in FIG. 8). In this case, the components of the system may be realized within a single computing device, or distributed amongst several interconnected computing devices.

The present disclosure describes a technical solution for automated detection of phishing sites and informing users about phishing sites using computer networks that include components for implementing a machine learning model. In one aspect, the present disclosure forms training samples based on information about sites, including their pages. The training samples are used to train or retrain the machine learning model, and to conduct "cleaning" of the data obtained in the process of detecting phishing sites from "junk" data. The performance of a machine learning model depends on the quality of the data on which the model is trained. Therefore, "junk" data is considered to be data that affects the occurrence of Type I and Type II errors. In other words, junk data reduces the likelihood of detecting phishing sites or increases the likelihood of identifying legitimate sites as phishing, which increases the likelihood of false positives of this model. Thus, the teaching of the present disclosure makes it possible to analyze a large number of sites more efficiently and quickly to identify phishing sites.

It is worth noting that the approaches presented herein, depending on the implementation, allow for the determination of similarities between a target site and a large set of sites more accurately and quickly than known solutions for site comparison.

The method and system of the present disclosure may be implemented in conjunction with such systems that are designed to collect information about sites, including site content, from various servers connected to the Internet, analyze the collected information to determine whether the site information corresponds to previously posted information on the site, classify sites based on determining similarity in site content to previously classified sites, including determining whether the site is phishing. Thus, system of the present disclosure may act as an intermediary between sites and other network participants who access the sites, for example, to determine whether a site is phishing or malicious.

Aspects of the present disclosure use the analysis of site pages through a Document Object Model (DOM) object. First, a DOM object is generated for each page. Then, the generated DOM objects are converted into a certain form, and based on it, several types of hashes are generated. The hashes that are generated are used for a more accurate comparison of site pages and/or the comparison of the sites themselves. After that, the machine learning model is trained, which is then used to identify phishing sites. This approach makes it possible to more accurately identify similarities between pages or sites, which leads to a decrease in the number of false positives when identifying phishing pages and/or sites and, accordingly, increases the share of true positives, i.e. detection of phishing sites.

For ease of understanding, the logical structure for performing the analysis of site pages is briefly described below.

A website page, or simply the "page", refers to an independent part of a web resource, which is a text file in the format of one of the document markup languages (for example, in HTML or XHTML format), while the page has its own unique address (URL). Each page is created using a markup language and contains at least the main tags: the head, which contains the Title and metadata (e.g., Keywords, Description), and the main body, which contains the content. Tags have values and attributes that also have values.

A DOM refers to a platform-agnostic and language-agnostic interface that allows users to dynamically access and update the content, structure, and style of HTML, XHTML, and XML text files (hereinafter referred to as text files). The text files may include any data. For example, a text file might include HTML code for a page received from a Web server.

A DOM object defines the logical structure of a text file, or how a text file is accessed, and allows the text file to be manipulated through a tree-like structure called a DOM tree. Tags are the basis of each marked-up text file, in particular HTML tags. Based on the DOM, each tag in a text file is an object. Nested tags are referred to as the "children" of a parent. The text that is inside the tag is also an object. The DOM allows client applications to dynamically access, interact, and update site information received from one or more Web servers.

The attribute "site information" may include any relevant information related to the site or host (e.g., server) on which the site is hosted. For example, site information may include: the URL of the site; the HTML code received after communicating with the web server; headers of the response from the web server Metadata associated with the HTML code; and any other information that may be obtained from a web server to display a page linked to the site.

Figure 1:
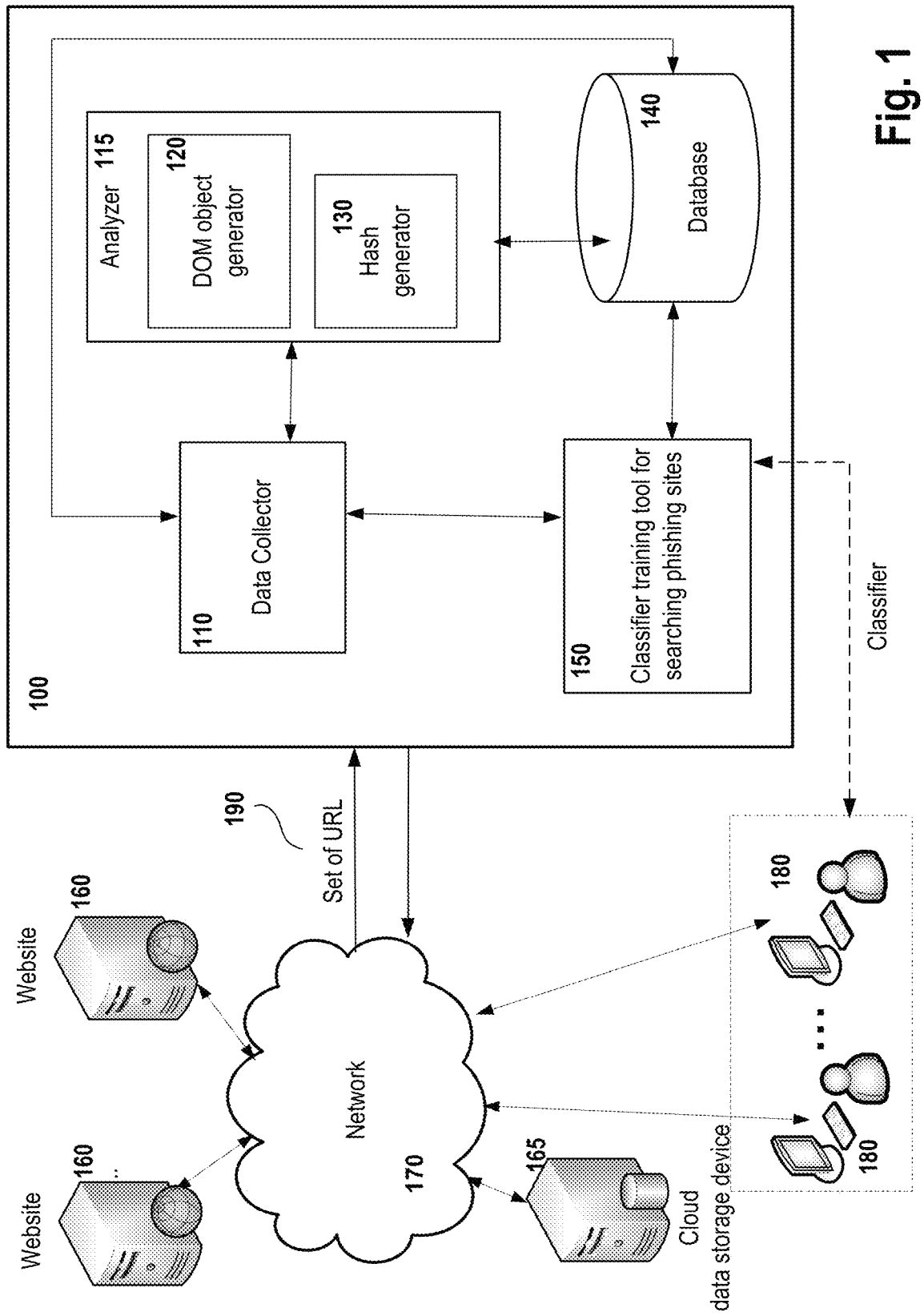
FIG. 1 illustrates a block diagram of an exemplary system for creating a classifier that includes a machine learning model for detection of phishing sites using DOM hashes in accordance with aspects of the present disclosure.

FIG. 1 illustrates a block diagram of an exemplary system 100 (hereinafter referred to as the classifier generation system 100) for creating a classifier that includes a machine learning model for detection of phishing sites using DOM hashes in accordance with aspects of the present disclosure. The system for creating classifier 100 is designed to train a machine learning model, which in turn is designed to detect phishing sites. In one aspect, the classifier generation system 100 is implemented on a computer system, such as that shown in FIG. 8.

In a preferred aspect, the classifier generation system 100 includes tools such as a data collector 110, an analyzer 115, a database 140 for storing data, and a classifier training tool 150, wherein the training is designed to search for phishing sites. The analyzer 115 includes a DOM object generator 120 and a hash generator 130. Depending on the implementation, all components of the classifier generation system 100 can be interconnected at both the hardware and software levels, and it is possible to implement the combined use of the hardware and software layers.

The data collector 110 is designed to interact with one of more of: websites 160 (also referred to as simply as "sites 160"), which are typically located on external devices; and with devices, such as cloud data storage device 165, to gather necessary information about the sites. It is worth noting that the data collector 110 may be implemented, among other things, in any suitable and known manner designed to locate, retrieve, and store information about sites.

Communication with the sites 160 and cloud data storage device 165 is both wired and wireless, e.g., over the network 170. In general, an example of a network 170 is the Internet. External devices hosting sites 160 are, for example, computer systems such as hosting that host and store data. Such data is not only the sites themselves, but also information related to them, such as the URL of a site or a site page. The data collector 110 may also communicate with various DNS servers (DNS servers) and search engines to gather information about websites. The external data storage device 165 is a cloud storage device, which in turn interacts with search engines and is designed to collect and store information about websites. In another aspect, data storage device 165 is a cloud infrastructure, such as Kaspersky Security Network (KSN). KSN is a cloud services infrastructure that provides access to an online knowledge base about the reputation of files, Internet resources (sites) and software. The data storage device 165 may contain information about legitimate files, Internet resources (sites), and software, as well as malicious ones, such as phishing sites and pages.

The data collector 110 may collect information about sites either automatically or by interacting with various search engines, or by a request from other tools of the classifier generation system 100 or a query received from a user of the classifier generation system 100 via one of the input means (not shown in FIG. 1). The data collection is performed in automatic mode, is an approach used by web crawlers to regularly and/or periodically crawl hosted sites 160 and accessible via network 170.

In one aspect, the data collector 110 receives a set of URLs 190 from an external data storage device 165. In this case, the data collector 110 collects information about sites based on URL links from the set of URLs 190. Information is collected by clicking on the links associated with the URLs and downloading the necessary information, such as the site itself or pages of the site in the form of a text file, and/or downloading other site resources.

Once the site information is collected, the data collector 110 transmits the collected information to the analyzer 115.

The analyzer 115 is designed to generate a set of hashes for each site and/or for each page thereof. The hash set for each page or site contains at least two types of hashes. In a preferred aspect, the hash set consists of three types of hashes. Three types of hashes allow the user to search for similar sites and/or detect phishing sites in the most efficient way. At the same time, depending on the implementation of the method of the present disclosure, it is possible to use the same hash. Thus, at least one type of hash is generated, for example, for tasks associated with identifying page or site similarities. It is worth noting that, in an aspect, where only one type of hash is used, the hash must be created using a DOM object.

The analyzer 115, using the DOM object generator 120, parses each page received from the data collector 110. Page parsing refers to the automated process of extracting data or information from a page that takes the form of a text file. During the parsing process, the analyzer 115, using the DOM object generator 120, creates a tree structure of the page, namely the DOM tree. FIG. 5a illustrates an exemplary of a DOM tree 501 for a site page in accordance with aspects of the present disclosure.

In one aspect, the DOM object generator 120 uses the Python lxml library to parse the page. In another aspect, using the lxml library, the DOM object generator 120 also performs page repairs, e.g., correcting the DOM tree and generating code (e.g., html code) from the page based on the page tree-like structure. For example, code generation consists of recovering missing closing tags. Once the DOM tree has been generated, the DOM object generator 120 passes it to the hash generator 130. The hash generator 130 converts the resulting DOM tree into a specific form, namely, it forms at least one string of DOM tree elements of the page according to a particular pattern. Each template defines how a string is formed from elements of the DOM tree of the page.

For example, the first pattern is used to generate the first line, according to which only the names of the tags are used to form the string. To do this, the hash generator 130 removes all text and all values and forms a chain of tags, for example: html, head, title, body. The resulting string is unique. To form the second line, a second pattern is used, according to which the principle remains the same as when forming the first line, only the names of the tags, and additionally the names of the tag attributes are used. FIG. 5b illustrates an example of string generation 502 from a DOM page object in accordance with aspects of the present disclosure. The example of string generation 502 shows both lines, which are formed based on the DOM tree shown in FIG. 5a.

Next, the hash generator 130 generates a hash for each generated string, and also additionally generates a hash from the page itself (i.e., from the text file). In one aspect, the hash generator 130 generates the hashes based on the MD5 algorithm. Thus, hash generator 130 generates at least three types of hashes for each page, where the first hash is generated from the entire page (content hash or content_md5), The second hash (hash_light) is formed from the first string, i.e., from the string formed according to the first pattern, and the third hash (hash_full) is formed from the second string, i.e., from the string formed according to the second pattern. Once all the hashes for each page have been generated, the hash generator 130 passes the generated hashes to the database 140. It is worth noting that if additional strings are generated from additional templates, the hash generator 130 will also generate additional hashes based on the additional strings.

In one aspect, the analyzer 115 checks each page for novelty at the outset. In other words, it determines whether or not analyzer 115 has previously received the corresponding page for analysis. In this case, the analyzer 115 will first generate a hash from the page itself (the first hash) using the hash generator 130 and check for the presence of this hash in the database 140. In the event that the analyzer 115 detects a hash in the database 140, then the analyzer 115 excludes the page from further analysis. Otherwise, if the analyzer 115 does not find a matching hash in the database 140, then the analyzer 115 will perform further analysis based on the fact that the hash from the page itself has already been generated.

The database 140 is a machine-readable medium that is designed to store information about sites and their pages, wherein the stored information includes both generated hashes and additional information about the sites, such as the URLs of HTML pages. Additional information may be provided by either the analyzer 115, the data collector 110, or the classifier training tool 150.

FIG. 6 illustrates an example 601 of a database 140 containing classified hash functions of site pages for training a machine learning model in accordance with aspects of the present disclosure.

In one aspect, the database 140 is a database expressed as a table in which each row contains information for one hash. The information for the hash includes at least:

Hash—hash value,

Hash_type is the type of hash (e.g., hash from page "content_md5" (first hash), hash "hash_light" (second hash), hash "hash_full" (third hash)).

In one aspect, the database 140 further comprises information for the hash, which includes the assignment of the hash and the decision that is made on the corresponding hash. For example, the purpose of the hash may be that the hash is used for training (train_action) and whether it is for training or validation. An example of a hash decision is to indicate that the hash is a hash, pointing to a phishing site (mark_as_phish) or hashes pointing to a "clean" page or site (mark_as_clean).

It is worth noting that database 140 contains information about both safe pages and phishing pages. Safe pages are pages that do not pose a threat of data loss to third parties and do not use mechanisms to detect phishing sites. Also, such pages are pages that are created and modified only with the permission of the site owner, if the site owner has a verified identity.

In one aspect, the analyzer 115, for each type of hash from the database 140, determines the popularity of the hash and ranks the hash according to a particular popularity. In one aspect, popularity of the hash is determined based on the analysis of pages over a period of time, e.g., over six months. For example, the analyzer 115 may determine how many identical hashes from pages have been generated in the last six months. Accordingly, the greater the number of pages that have the same hash, the more popular this hash is determined as being.

The purpose of the classifier training tool 150 is to train or retrain a classifier that includes a machine learning model to search for phishing sites. The classifier training tool 150, while training the classifier, interacts with the database 140. The classifier training tool 150 generates two datasets. The first dataset contains information about safe pages, and the second dataset contains information about phishing Pages. Page information refers to previously collected information about websites, in particular information about hashes. Each dataset is based on hash information, specifically hash assignment information. In a particular aspect, the datasets are generated based on the frequency of the hash among all the hashes generated and the length of the DOM tree from which the hash is generated.

In one aspect, the information contained in each dataset includes information about pages and sites, which can be divided into three groups. The first group includes information about the content contained on the pages, such as information about organizations, the need to enter a password, or other user data. The second group includes information about URLs, such as the form of the string and the presence of spaces and special characters. The third group includes page information obtained from external sources, such as the WHOIS service. Also, the sets can additionally include information about the popularity of a particular domain.

It should be noted that the formation of data sets using hashes formed on the basis of DOM trees allows you to get the most balanced data sets, in turn, the most balanced data sets make it possible to subsequently train the classifier with the greatest efficiency. In other words, this approach makes it possible to maintain a balance between homogeneous and diverse information in data sets, in particular by eliminating "junk" data.

Depending on the aspect, all or part of the hashes stored in the database 140 and their associated information may be used in the formation of data sets. The features used in the formation of data sets include at least the number of hashes stored in the database 140 and the date of the hash formation, i.e., the relevance of the hash.

The classifier training tool 150 further divides each dataset into two parts, where the first part is the training subset (the training set) and the second part is the test subset (the test set). On the training subset, the classifier training tool 150 trains the classifier, namely the machine learning model, and uses the test subset to verify the trained classifier. For example, by dividing the data into two parts (i.e., two subsets) based on the proportion of the total data, for instance, 70% as training sample and 30% as test sample. It is noted that the proportion can change depending on the amount of data in each dataset.

In a particular aspect, the classifier training tool 150 divides the dataset into three parts. In this case, a third, validation subset (validation sampling) is added to these two subsets. Validation sampling is designed to select a decision threshold for a machine learning model trained on a training sample. After the threshold for decision-making is selected, the final quality check of the specified model is carried out.

In one aspect, the classifier training tool 150, when generating two datasets, further performs data cleansing to improve the sample of data for training. The data cleansing is based on the fact that the generated hashes, especially hashes corresponding to the hash type hash_full (the third hash), are sufficiently unique identifiers of pages with an accuracy of variability associated with reflecting the characteristics of a particular user or session on the Site. For example, a home page on a social network is the same page, regardless of what name, surname, photo, and similar data fills the corresponding slots (e.g., input fields) of the page. Duplicate unique identifiers (hashes) of pages with different content are also common for special pages, such as error messages. Thus, the more often a hash occurs in both data sets, the more likely it is that it is a special page. Data cleansing uses an approach in which the classifier training tool 150 excludes both duplicate hashes and those associated with special pages in at least one of the datasets. This data cleansing allows you to prepare the most optimal datasets to train the classifier that contains the machine learning model. This approach addresses one of the drawbacks of machine learning, namely training on datasets that are in which very similar objects were present. For example, the same hashes were present in both datasets. When training on similar data, the performance of the trained machine learning model decreases and false positives occur when the trained machine learning model makes decisions.

In yet another aspect, the classifier training tool 150 cleans up both datasets as follows. First, the classifier training tool 150 generates a set of the most popular hashes for the clean hashes and a set of the most popular hashes for the phishing hashes by accessing the database 140 and then searching, provided that the database 140 does not yet contain information about the popularity of hashes. The classifier training tool 150 then identifies hashes that correspond to hashes related to both datasets. Once at least one such hash has been identified, the classifier training tool 150 determines which page the hash belongs to and removes the hash from one dataset and retains the hash in the other dataset. For example, if the hash refers to a special page, then that page is secure, and accordingly, the hash is removed from the dataset related to phishing sites and remains in the dataset related to safe sites. In addition, the classifier training tool 150 adds or modifies information about the specified hash in the database 140 as follows: the "Training Action" column reads "to be deleted (none)" and the "Decision Made" column reads "clean (mark_as_clean)." In another example, if the hash is from a phishing page, then the classifier training tool 150 leaves such a page only in the dataset related to phishing sites.

Next, the classifier training tool 150 checks for data diversity in each specified dataset. Since if each dataset has a group of similar objects (hashes), and such a group is quite large, then such a data sample can also negatively affect the quality of the classifier's training. For example, a dataset contains one hundred thousand (100,000) groups, and the objects of one of the groups occupy more than 1% of the entire set. In another example, the dataset contains ninety thousand (90,000) groups, with the features of one of the groups occupying more than 5% of the entire set. In another example, multiplicity is determined empirically. Therefore, in each dataset, the classifier training tool 150 selects at least one group of hashes related to a page that occurs more than N times in the corresponding dataset, where N is a configurable parameter and is practically determined.

In one aspect, the parameter N is determined based on the ratio of the total number of hashes in the dataset to the hashes associated with a single page. If the classifier training tool 150 determines that no group has been selected, it means that each set of hashes is optimal for further training of the classifier that includes the machine learning model. Otherwise, the classifier training tool 150 in each selected group randomly selects K pages, where K is a configurable parameter and is determined in a practical way. The classifier training tool 150 leaves the pages whose hashes are related to the selected. For pages in the dataset, the classifier training tool 150 removes, from the dataset, the remaining pages whose hashes belong to the selected group. It's worth noting if the dataset is from phishing sites, then the classifier training tool 150 adds relevant information about the page, namely the hash, to the database 140. For example, an entry will be added to the string of the specified hash that the decision being made is "phishing". In addition, the classifier training tool 150 may perform an additional check to determine whether the page to which the hash relates is phishing.

In one aspect, an additional verification is made by querying the protection components (not shown in FIG. 1), wherein the queries are related to solutions for analyzing, detecting, and responding to phishing sites. If the dataset is a "clean" site, the classifier training tool 150 adds, to the hash record in the database 140, that the decision is a "clean page."

The classifier training tool 150 then trains a classifier comprising the machine learning model based on the generated and optimized datasets. Depending on the implementation, the training of the machine learning model is based on at least one of the following principles: supervised learning, such as logistic regression, linear regression, or k-nearest neighbors algorithm (k-NN); or neural networks. After training of the classifier, the classifier training tool 150 verifies (quality check) of the trained classifier on the test subset. If the trained classifier did not exceed the specified threshold when making incorrect decisions, i.e., the number of false positives is below the maximum permissible level, then the classifier training tool 150 transfers the classifier to be used on subsequent classifications. Otherwise, if the trained classifier makes a number of wrong decisions that exceeds the specified threshold, i.e., the number of false positives exceeds the maximum permissible level, then the classifier training tool 150 retrains the classifier. During retraining, the classifier training tool 150 generates a new training dataset or updates at least one training dataset. To update the dataset, the classifier training tool 150 Makes a request to the data collector 110 to gather new or additional information about the sites.

In one aspect of the retraining, the classifier training tool 150 may further make changes to hyperparameters of the machine learning model, such as to the training rate and to the size of the dataset. In another aspect, the classifier training tool 150 may also change the size of the machine learning model, such as the number of nodes in a neural network.

In one aspect, the classifier training tool 150 passes a classifier for detecting phishing sites to the protection components 185 (shown in FIG. 2) that are responsible for detecting phishing sites on the client device 180. Depending on implementation, the protection components 185 may be aimed to both protect against cyberattacks and malware and for security against data theft. The solutions for accomplishing the tasks of the protection components 185 may be implemented both on the client device 180 and on various servers of corporate networks.

In yet another aspect, in addition to passing the classifier, at least one type of generated hashes, e.g., a third type of hashes, is additionally passed to the security components. These hashes can also be used in conjunction with the classifier when comparing sites for similarity or detecting phishing sites as a preliminary step.

In another aspect, if the classifier training tool 150, when generating a dataset related to clean sites, determines that the page does not contain phishing content, then the corresponding hashes are marked as clean and the rendered solution is determined to be a blank page. For example, a page refers to a server's error message.

Figure 2:
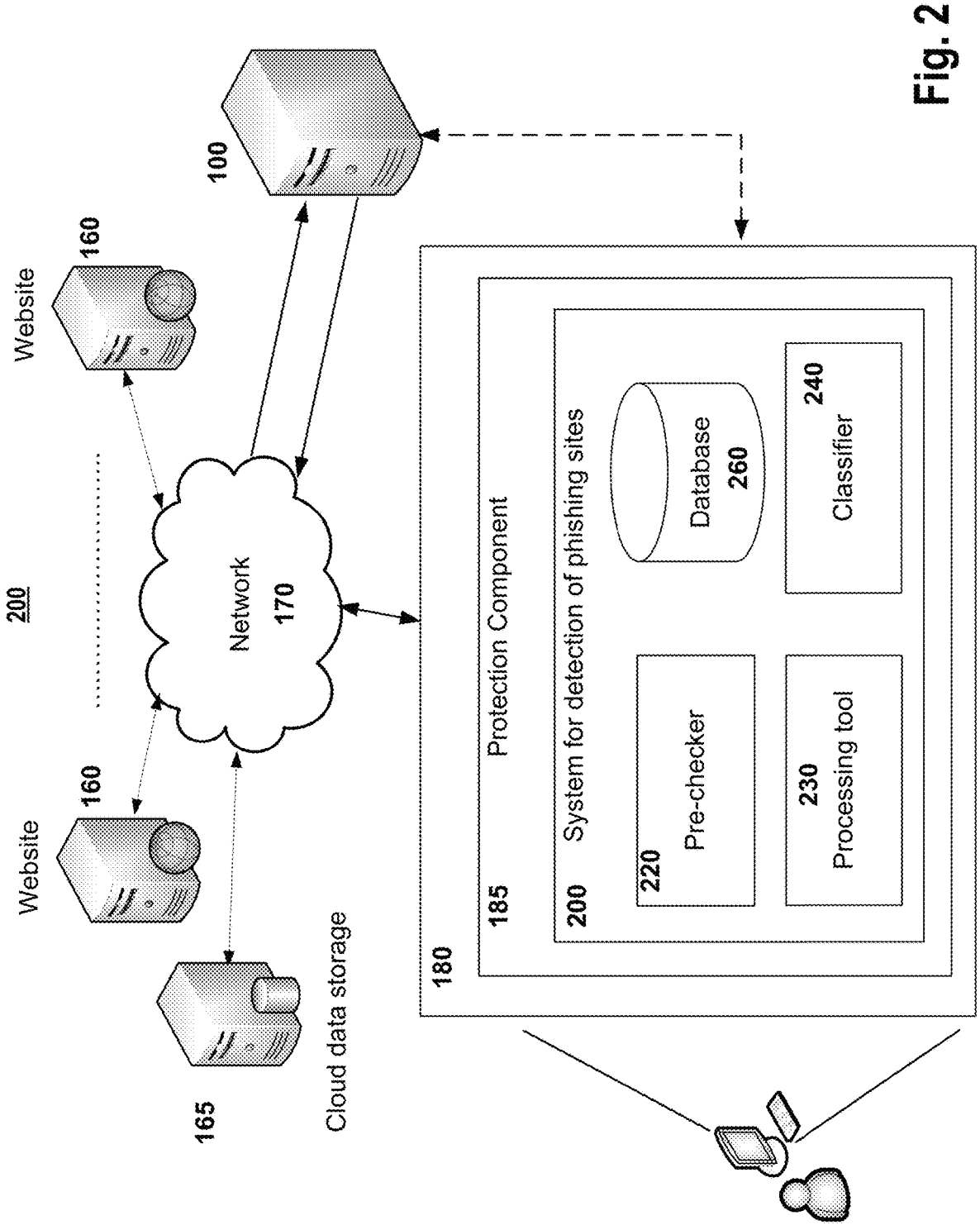
FIG. 2 illustrates a block diagram of an exemplary system detection of phishing sites using DOM hashes that includes a retrainer of a classifier in accordance with aspects of the present disclosure.

FIG. 2 illustrates a block diagram of an exemplary system 200 for detection of phishing sites, e.g., using DOM hashes, that includes a retrainer of a classifier in accordance with aspects of the present disclosure. The phishing site detection system (hereinafter referred to as the detection system) 200 is carried out on at least one computer system, such as that shown in FIG. 8.

Depending on the aspect, the detection system 200 may be implemented either as part of the protection component 185 on the client device 180, or separately from the protection component 185 (the separated implementation is not shown in FIG. 2), or in conjunction with the classifier generation system 100 on a single device, wherein the detection system 200 interacts with the classifier generation system 100 regardless of the implementation. In addition, the detection system 200 and the classifier generation system 100 may be implemented as a single system.

In one aspect, the detection system 200 includes tools such as a pre-checker 220, a processing tool 230, a classifier 240 including a machine learning model, and a database 260. Depending on the aspects, all tools can be interconnected at both the hardware and software levels, and the option of implementing and collaborating is possible application of hardware and software layers.

In one aspect, upon receipt of a task to scan a site or a page thereof, the protection component 185 transmits the relevant data to the detection system 200. The task may be received in the form of a URL (link), in which case, the protection component 185 will pre-download the content (text of the HTML code of the page) of the corresponding resource from the received link. In addition, the protection component 185 converts each HTML page into a text file, as needed.

In one aspect, the pre-checker 220 is designed to inspect the page received by the detection system 200 using hashes from the database 260. The pre-checker 220 generates a hash of the page itself (i.e., a hash of the text file). In one aspect, the hash is generated based on the MD5 algorithm. In another aspect, a hash may be derived from any other known hashing algorithm, e.g., CRC32, SHA256, SHA512. The pre-checker 220 then compares the generated hash with the hashes from the database 260. The database 260 contains at least two sets of hashes, wherein one set includes hashes from safe pages and a second set includes hashes from phishing pages. In the event that pre-checker 220 finds the generated hash in the database 260, the detection system 200 will identify the scanned file as either a phishing file or a safe file, depending on the set of hashes which the scanned hash was detected. Otherwise, if the hash is not found in database 260, the pre-checker 220 passes the page to the processing tool 230.

In one aspect, the detection system 200 does not include a pre-checker 220. In this case, the resulting page is immediately sent to the processing tool 230, which performs a preliminary analysis of the page.

The processing tool 230 is designed to: convert a page to at least one string of page DOM tree elements according to a pattern; generate at least one hash for each generated string; and validate the generated hashes in database 260. It is worth noting that processing a page to generate a particular type of hash is similar to that of the analyzer 115. The functionality of processing tool 230 may be said to correspond to that of the analyzer 115. For example, the processing tool 230 first parses the page, which creates a tree structure of the page, i.e., a DOM tree. Next, the processing tool 230 converts the DOM tree to at least one line according to a specific pattern from the elements of the DOM tree of the page. The processor tool 230 then generates a hash from each generated string. In one aspect, the processing tool 230 generates at least two types of hashes for each page, wherein one hash (hash_light) is derived from a string formed according to the first pattern and another hash (hash_full) is generated from a string formed according to the second pattern. After all hashes for the page have been generated, the verifies the resulting page by comparing the generated hashes with similar hashes from database 260. In the event that hashes are found in database 260, the detection system 200 determines whether the site is phishing. Otherwise, if no hashes are found, the processing tool 230 passes the resulting page to the classifier 240. In particular, the transmission of the received page to the classifier 240 includes transmission of information about the content and metadata of the page.

In yet another aspect, the pre-checker 220 and processing tool 230 are co-implemented. In this case, the resulting page is pre-validated using both a hash generated from the entire page and at least one hash generated from a string of DOM tree elements. For example, first a check is performed using a hash from the entire page, and if the hash is not found in database 260, then, the hashes formed from rows from the elements of the DOM tree of the page are checked, i.e., the hashes are applied sequentially. Also, the use of these hashes can be carried out in parallel.

In one aspect, the classifier 240 includes a machine learning model and is designed to determine whether a page is phishing based on information received from the processing tool 230. The classifier 240 provides input to the trained machine learning model. The output of the machine learning model provides the classifier 240 tools for deciding whether a page matches known phishing pages or sites. Classifier 240 provides the protection component 185 with a decision as to whether a site is a phishing site.

In one aspect, the database 260 comprises a machine-readable medium that is designed to store and provide stored data to detection system 200 on demand. As mentioned earlier, the stored data is at least two sets of hashes, where one corresponds to safe pages and the other corresponds to phishing pages. It is worth noting that these sets include pages that can be unambiguously defined as safe pages or phishing.

In one aspect, the detection system 200 has the ability to retrain the classifier 240. In this case, the detection system 200 directs each decision made to the classifier generation system 100. In turn, the classifier generation system 100 evaluates each decision. In the event that the classifier generation system 100 identifies the decision as false, it will retrain the classifier, namely it will retrain the machine learning model. The retraining is carried out while taking into account at least one false decision. The classifier generation system 100 then provides the retrained classifier to the detection system 200.

It's worth noting that classifier 240 is designed to successfully determine whether a site is phishing or not, even in cases where other protection mechanisms have failed to make a decision. Such situations are common when attackers disguise their sites by modifying them. As a rule, the changes relate to the content of the site.

For instance, consider peculiarities of an example use of the hashes of the HTML pages presented herein, formed on the basis of the DOM trees of the HTML pages shown in FIG. 7.

Suppose the first page contains some HTML and content, and the first page is a suspicious page 701. For example, the first page may be a phishing page that is designed to steal banking data. Suppose the second page 702 is also a suspicious page and a different version of the first page. The difference being that the second page 702 has the same functionality as the first page 701, but at the same time, the second page 702 counteracts detection by: spoofing some of the characters and adding fake values for class attributes. It is worth noting that in FIG. 7 to demonstrate the spoofing is obvious, in the real samples the homographic attacks are performed more subtly.

Then, for each page, hashes are formed according to the previously mentioned principle, namely:

Form an MD5 hash from each page;

Get a DOM tree by parsing an HTML page using the LXML library;

Convert the generated DOM tree for each page into two lines:

For the first line, the first pattern is used, according to which only the names of the tags are saved, For the second line, the second pattern is used, according to which the names of the tags and the names of the tag attributes are stored; and Generate hashes for the received strings.

For example, the MD5-based hashes for each page of the whole page may look like this:

For the first page—397ac9d66c21ec19ae55a3-c758d6443d,

For the second page—39c7706b85321872a6e4b-ae79eff3064.

One can see that the changes made to the content of the second page also changed the hash of the second page. Therefore, it will not be possible to group pages based on the hashes of such pages (files), and there is a need to generate new samples (hashes) each time to block phishing sites (for example, when blocking by signature). In other words, if a hash is generated from the entire page, then a small change in the content of the page will change that hash as well.

At the same time, the structure of the pages remained the same as shown below:

First line (tag structure):

For the first page:

DOC|HTML|HEAD|TITLE|/TITLE|/HEAD|BODY|H1|/H1 |/BODY|/HTML|/. DOC

For the second page (masked):

DOC|HTML|HEAD|TITLE|/TITLE|/HEAD|BODY|H1|/H1 |/BODY|/HTML|/. DOC

The second line (tag and attribute structure):
   For the first page:
      DOC|HTML|HEAD|TITLE|/TITLE|/HEAD|BODY|H1:CLASS/H1 |/
      BODY|/HTML|/.DOC
   For the second page (masked):
      DOC|HTML|HEAD|TITLE|/TITLE|/HEAD|BODY|H1:CLASS/H1 |/
      BODY|/HTML|/.DOC.

As can be seen above, the lines for both pages are identical. Therefore, if hashes are generated based on the received rows, the hashes for both pages will be the same. For example, strings of the second type in the form of hashes (a structure of tags and attributes) would look like:
   For the first page—fbec7f8965c8f1c9c5986c076b7de5cd,
   For the second page—fbec7f8965c8f1c9c5986c076b7de5cd.

Thus, when using the declared solution, it is additionally possible to form hashes and group similar pages into clusters based on the conversion of DOM objects of pages thereby creating strings.

In one aspect, this principle is designed not only to find phishing sites, but also to detect similar pages.

As an example, consider two pages:
   https://www.google.com/error, and
   https://www.google.com/another_error.

Then, hashes generated based on whole pages will be different, while hashes generated using DOM objects and strings will not be different, as shown below:

Hashes based on whole pages:
   1) cfa900f6311e2e675c95de0788684d2b,
   2) 696531ac087387b995e3376a36b333d1.

Hashes based on the string of the first type for the specified pages:
   1) 4841ea35c8deb90b749f2f1b2aed8a11,
   2) 4841ea35c8deb90b749f2f1b2aed8a11.

Hashes based on the second type of string for the specified pages:
   1) d8085a405ad249ece59f79744c94158f,
   2) d8085a405ad249ece59f79744c94158f.

In this way, using the method of the present disclosure, large groups of pages that are similar can be identified to the exact structure and these similar pages may then be removed from the training sample (or the sample may be balanced, leaving only a few examples from each group).

Figure 3:
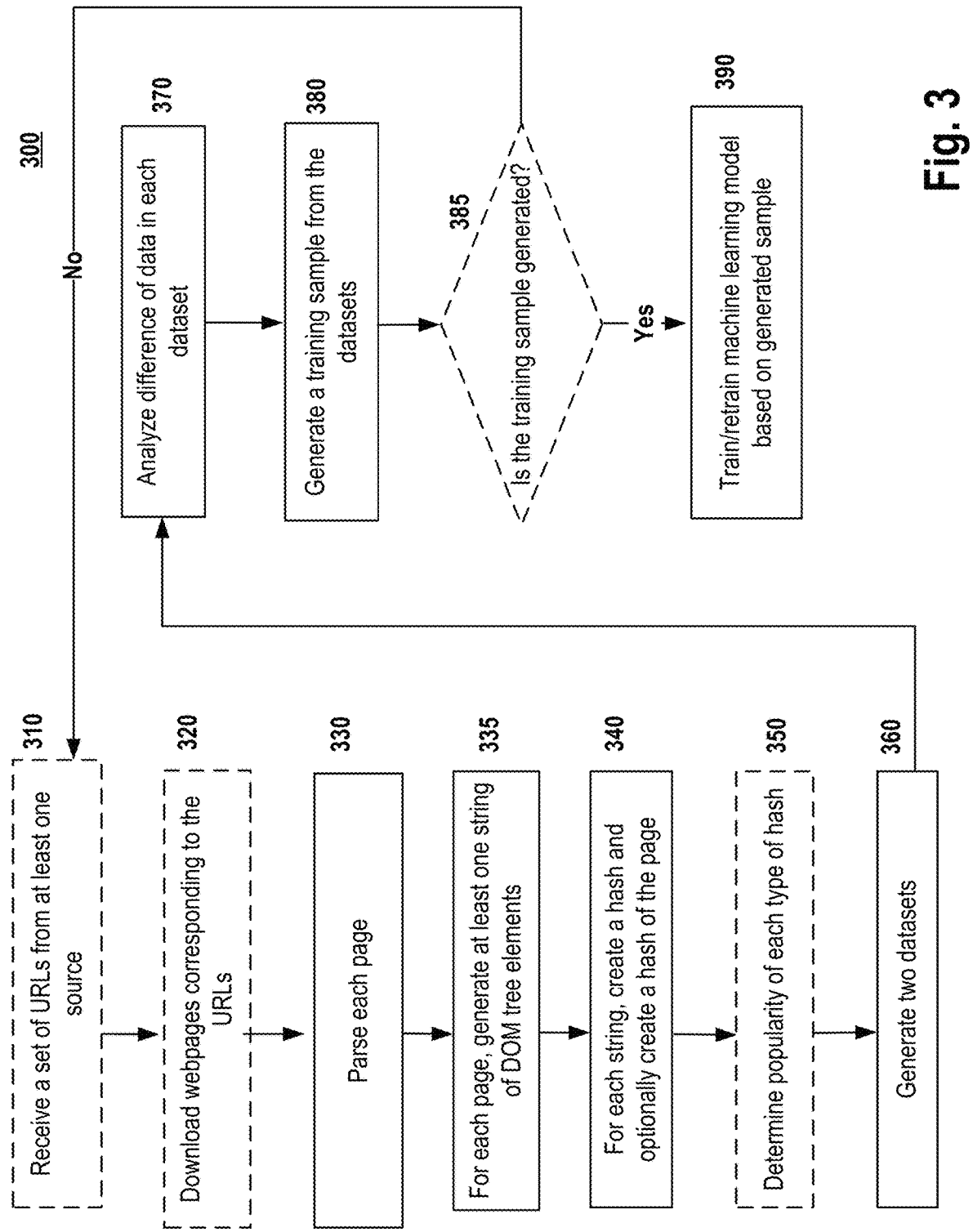
FIG. 3 illustrates an example of a method for training or retraining a machine learning model to detect phishing sites using DOM hashes in accordance with aspects of the present disclosure.

FIG. 3 illustrates an example of a method 300 for training a machine learning model to detect phishing sites using DOM hashes in accordance with aspects of the present disclosure. Thus, method 300 may be used to train the machine learning model to detect phishing sites.

In step 310, using the data collector 110, method 300 obtains a set of URLs from at least one source.

In step 320, via the data collector 110, method 300 downloads pages and/or sites as HTML text files based on the set of URLs.

In one aspect, steps 310 and 320 are optional. In this case, the training pages are retrieved from a database, e.g., the database 140, or from a similar database that stores information about the sites.

In step 330, method 300 parses each page of one or more pages.

In one aspect, the parsing of the page includes at least generating a DOM tree of the page thereby creating a tree-like structure of the page. Thus, a DOM tree, is created for each respective page of the one or more pages.

In one aspect, the page is obtained by at least one of: from a database; and from a website by downloading pages of the website based on a set of Universal Resource Locators (URLs) associated with one or more sources.

In step 335, for each page of the one or more pages, method 300 generates at least one string of DOM tree elements according to one of more predetermined patterns (or templates).

In one aspect, a pattern of the one or more predetermined patterns defines how the string is formed from elements of the DOM tree of the page using a template. Thus, each pattern of the one or more predetermined patterns defines how a string is formed from elements of the DOM tree of the page.

In one aspect, the at least one pattern comprises at least one of the following: a first pattern that generates a string based on tag names in the DOM tree of the page; and a second pattern that generates a string based on tag names and tag attribute names.

In one aspect, the first pattern is used to form the first string, according to which only the names of the tags are used to form the string. To generate the second string, the second pattern is used, according to which the names of the tags and additionally the names of the tag attributes are used to form the string. Thus, in step 335, two strings are generated for each page.

In one aspect, at least two strings are generated, a first string being generated from the first pattern and a second string being generated from the second pattern.

In step 340, for each page of the one or more pages, method 300 creates a first hash based on the string of the generated at least one string, and optionally creates a second hash for the page (i.e., for the entire page). That is, in one aspect, the hash of the entire page is not created. Once all the hashes for each page have been generated, method 300 proceeds to step 350.

In a preferred aspect, three types of hashes are created for each page, where the first hash is generated from the entire page (content hash), the second hash (hash_light) is generated from the first line, and the third hash (hash_full) is generated from the second line.

In a preferred aspect, steps 330, 335, and 340 are performed using the analyzer 115.

In optional step 350, for each type of hash generated for the pages, method 300 determines the popularity that correspond to the resulting set of URLs. In one aspect, the popularity is determined based on the analysis of pages over a predetermined length of time, e.g., over a period of six months. For example, method 300 may determine how many identical hashes from pages have been generated over the past six months. Accordingly, the greater the number of pages that have the same hash, the more popular the hash becomes. In one aspect, step 350 is not included and method 300 proceeds from step 340 to step 360.

In step 360, method 300 generates a first dataset comprising information about safe pages, and a second dataset comprising information about phishing pages.

In one aspect, the generating of the first dataset comprising hashes of safe pages and the second dataset comprising hashes of phishing pages further comprises: whether there are groups of similar hashes in the respective datasets, wherein the groups of similar hashes are sufficiently large.

In one aspect, the information about a safe page or a phishing page comprises at least information about the respective page or a website of the respective page that has been previously collected. In one aspect, the first dataset is based on hash information. In one aspect, the second dataset is based on hash information. In particular, the datasets are generated taking into account a frequency of the respective hash among all the hashes created and a length of the DOM tree, and the hash is created based on the generated datasets.

In one particular aspect, in step 360, information contained in each dataset of the first dataset and the second dataset further includes information about pages and sites, including at least: for a first group that includes information about content contained in the pages, for a second group that includes information about URLs, and for a third group that includes information about pages obtained from external sources, such as the WHOIS service.

In another particular aspect, in step 360, each dataset of the first dataset and the second dataset is further divided into two parts, where the first part is a dataset containing a first subset for training (the training set) and a second part containing a second subset for testing (the test set).

In one aspect, in step 360, method 300 additionally performs data cleansing. The data cleansing is performed to improve data sampling for training. In one aspect, during the data cleansing, method 300 identifies hashes in the datasets that correspond to the hashes associated with both datasets, with the hashes derived from the DOM trees. Once at least one such hash has been identified, method 300 determines to which page the hash belongs. Then, method 300 removes the page to which the hash belongs from one dataset and leaves the corresponding page to which the hash belongs in the other dataset. An example of the implementation is provided in the description of FIG. 1.

In step 370, method 300 analyzes each dataset to determine whether there is a diversity of data in each dataset.

In one aspect, the analysis includes: determining whether there are groups of similar objects (hashes) in the datasets, and whether the determined groups are quite numerous; when the determined groups are numerous, selecting at least one group of hashes in the corresponding dataset that are related to the pages that occur more than a predetermined number of times, e.g., more than N times, in the corresponding dataset; for each of the selected at least one group of hashes, selecting a predetermined number of pages randomly, e.g., selecting K pages randomly; leaving pages whose hashes belong to the randomly selected pages in the dataset and removing, from the dataset, the pages whose hashes do not belong to the randomly selected pages; and when no group is identified, determining that each dataset is already optimal.

In one aspect, the parameter N is determined based on a ratio of a total number of hashes in the dataset to a number of hashes associated with a single page.

In one aspect, the analyzing of the first dataset and the second dataset to determine whether there is a diversity of data in each dataset further comprises: cleansing the first dataset and the second dataset, wherein the cleansing includes removing hashes from one of the first dataset or the second dataset hashes that have been found in both the first dataset and the second dataset.

In one aspect, the method further comprises: rechecking the diversity of data in each dataset after the cleansing.

In step 380, method 300 generates a training sample from the datasets when there is a diversity of data in each dataset. Each dataset used for generating the training sample contains information about pages corresponding to the hashes that are remaining (i.e., not removed).

In optional step 385, method 300 determines whether a training sample has been generated. When the training sample has been generated, method 300 sends the generated training sample to the machine learning model. When the training sample has not been generated, the method returns to step 310.

In step 390, method 300 trains and/or retrains a machine learning model based on the generated sample.

In one aspect, in step 390, method 300 additionally verifies the trained machine learning model. If the trained machine learning model does not exceed the specified threshold when making incorrect decisions on the test subset, i.e., the number of false positives is below the maximum permissible level, then the method ends. Otherwise, if the trained machine learning model outputs a number of wrong decisions, i.e., the number of false positives exceeds the specified threshold, the machine learning model is retrained as described above.

In one aspect, the method further comprises: testing the trained classifier on a subset of data dedicated for testing.

In one aspect, the classifier is retrained when a false positive is detected during validation on the subset of data dedicated for testing.

Figure 4:
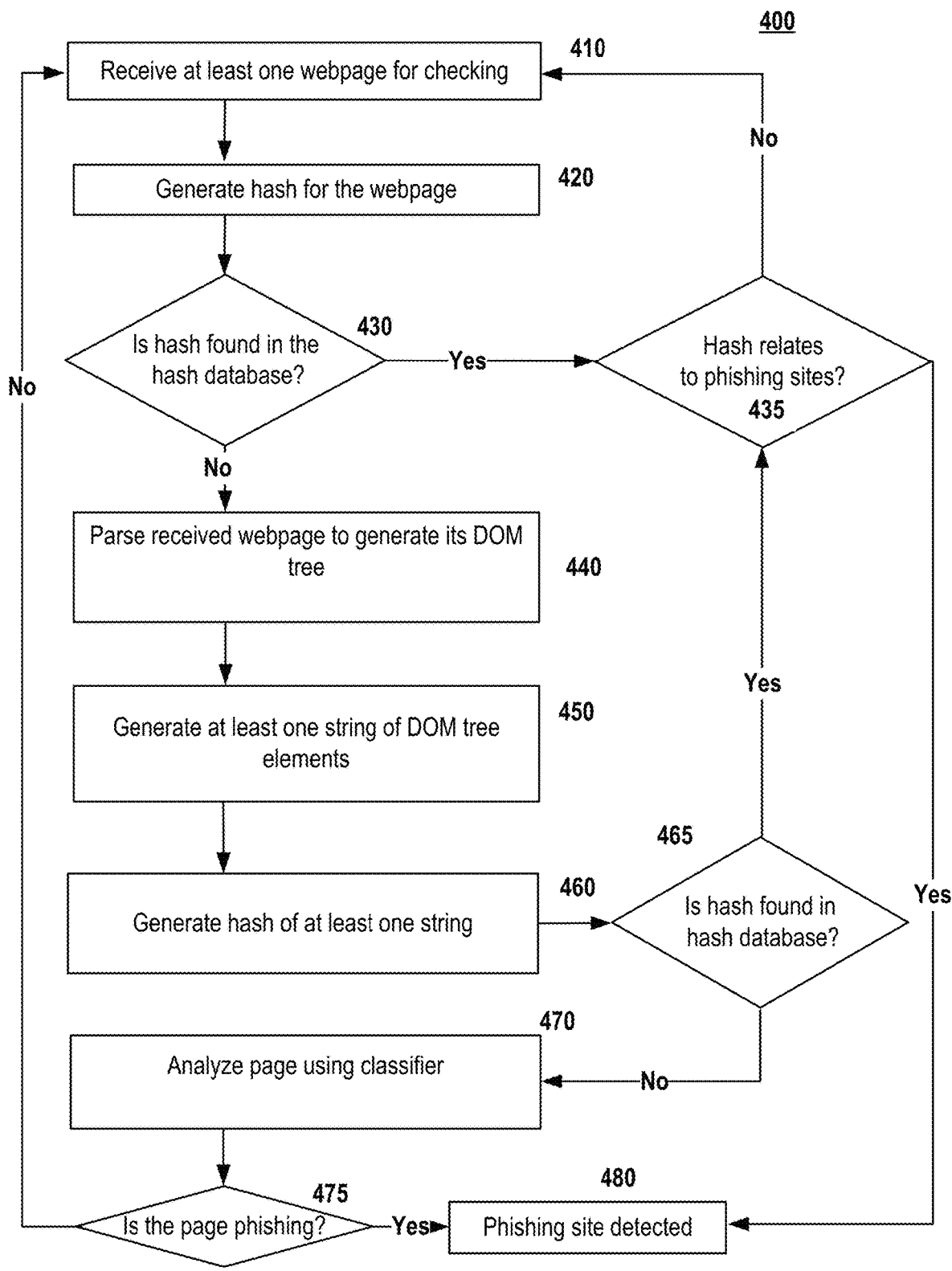
FIG. 4 illustrates a method for detecting phishing sites using DOM hashes in accordance with aspects of the present disclosure.

FIG. 4 illustrates a method 400 for detecting phishing sites using DOM hashes in accordance with aspects of the present disclosure.

In step 410, method 400 retrieves at least one page of a website. In one aspect, the at least one page is retrieved as an HTML text document.

In step 420, method 400 creates a hash of the at least one page.

In step 430, for each page of the at least one page, method 400 determines whether the hash is found in a database, e.g., a hash database 260. When the hash is found in the database, method 400 proceeds to step 435. When the hash is not found in the database, method 400 proceeds to step 440.

In step 435, for each page of the at least one page, method 400 determines to which hash set the hash found in step 430 belongs. When the hash belongs to a set of "clean" hashes, then method 400 proceeds to step 410 to check the next page. When the hash belongs to a set of phishing hashes, then method 400 proceeds to step 480.

In step 440, for each page of the at least one page, method 400 parses the page, wherein the parsing of the page includes at least generating a DOM tree of the page thereby creating a tree-structure representation of the page, namely creates the DOM tree for the page. The method then proceeds to step 450.

In step 450, for each page of the at least one page, method 400 generates at least one string from elements of the DOM tree of the page in accordance with a predetermined pattern. It is worth noting that the first pattern is used to form the first string, according to which only the names of the tags are used to form the string. To form the second string, the second pattern is used, according to which the names of the tags and additionally the names of the tag attributes are used to form the string.

In step 460, for each page of the at least one page, method 400 generates hashes for the page from at least one generated string. In a preferred aspect, three types of hashes are generated for each page, wherein the first hash is generated from the entire page (content hash), the second hash (hash_light) is generated from the first string, and the third hash (hash_full) is generated from the second string.

In step 465, for each page of the at least one page, method 400 searches the generated hash in a database, e.g., the database 260. When at least one hash is found in the database, method 400 proceeds to step 490. When no hash is found in the database, method 400 proceeds to step 470.

In step 470, method 400 parses the page using a classifier based on at least one hash generated for the page. To do this, method 400 sends information about the page corresponding to the specified hash to the input of the machine learning model. In particular, the sending of information about the page includes sending information about one or more of: the content and the metadata of the page.

In step 475, method 400 determines whether the parsed page is phishing based on a result of an analysis by a machine learning model. When the page is not a phishing, method 400 proceeds to step 410 to check the next page, or method 400 terminates, e.g., when all pages of the site are processed. When the machine learning model has decided that the page is phishing, method 400 proceeds to step 480.

In step 480, method 400 decides about a detected phishing site based on information obtained in step 475 or step 435.

In one implementation, steps 420 and 430 may be optional. In this case, after receiving the page, method 400 proceeds from step 410 to step 440.

In another implementation, the creation of a hash for the page in step 420 is performed in conjunction with the creation of hashes in step 460. In this case, the determination described in step 430 above is performed in step 465.

FIG. 8 is a block diagram illustrating a computer system 20 on which aspects of systems and methods for creating a classifier for detecting phishing sites using Document Object Model (DOM) hashes may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 8 above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method creating a classifier for detecting phishing sites using Document Object Model (DOM) hashes, the method comprising:
    parsing each page of one or more pages of the website, wherein the parsing of the page includes at least generating a DOM tree of the page;
    for each page of the one or more pages, generating at least one string of DOM tree elements according to one of more predetermined patterns;
    for each page of the one or more pages, creating a first hash based on the string of the generated at least one string, and creating a second hash for the page;
    generating a first dataset comprising hashes of safe pages and a second dataset comprising hashes of phishing pages, wherein there are similar hashes in the both datasets;
    analyzing the first dataset and the second dataset to determine whether there is a diversity of data in each dataset and at least removing hashes from one of the first dataset or the second dataset that have been found in both the first dataset and the second dataset;
    generating a training sample from the datasets when there is a diversity of data in each of the first dataset and the second dataset; and
    training a classifier of a machine learning model based on the training sample that is generated from the first dataset and the second dataset.

2. The method of claim 1, wherein the page is obtained by at least one of: from a database; and from a website by downloading pages of the website based on a set of Universal Resource Locators (URLs) associated with one or more sources.

3. The method of claim 1, wherein a pattern of the one or more predetermined patterns defines how the string is formed from elements of the DOM tree of the page using a template.

4. The method of claim 3, wherein the at least one pattern comprises at least one of the following:
    a first pattern that generates a string based on tag names in the DOM tree of the page; and
    a second pattern that generates a string based on tag names and tag attribute names.

5. The method of claim 4, wherein at least two strings are generated, a first string being generated from the first pattern and a second string being generated from the second pattern.

6. The method of claim 1, further comprising:
rechecking the diversity of data in each dataset after the removing.

7. The method of claim 1, further comprising:
testing the trained classifier on a subset of data dedicated for testing.

8. The method of claim 7, wherein the classifier is retrained when a false positive is detected during validation on the subset of data dedicated for testing.

9. A system creating a classifier for detecting phishing sites using Document Object Model (DOM) hashes, comprising:
at least one memory; and
at least one hardware processor coupled with the at least one memory and configured, individually or in combination, to:
parse each page of one or more pages of the website, wherein the parsing of the page includes at least generating a DOM tree of the page;
for each page of the one or more pages, generate at least one string of DOM tree elements according to one of more predetermined patterns;
for each page of the one or more pages, create a first hash based on the string of the generated at least one string, and create a second hash for the page;
generate a first dataset comprising hashes of safe pages and a second dataset comprising hashes of phishing pages, wherein there are similar hashes in the both datasets;
analyze the first dataset and the second dataset to determine whether there is a diversity of data in each dataset and at least removing hashes from one of the first dataset or the second dataset that have been found in both the first dataset and the second dataset;
generate a training sample from the datasets when there is a diversity of data in each of the first dataset and the second dataset; and
train a classifier of a machine learning model based on the training sample that is generated from the first dataset and the second dataset.

10. The system of claim 9, wherein the page is obtained by at least one of: from a database; and from a website by downloading pages of the website based on a set of Universal Resource Locators (URLs) associated with one or more sources.

11. The system of claim 9, wherein a pattern of the one or more predetermined patterns defines how the string is formed from elements of the DOM tree of the page using a template.

12. The system of claim 11, wherein the at least one pattern comprises at least one of the following:
a first pattern that generates a string based on tag names in the DOM tree of the page; and
a second pattern that generates a string based on tag names and tag attribute names.

13. The system of claim 12, wherein at least two strings are generated, a first string being generated from the first pattern and a second string being generated from the second pattern.

14. The system of claim 9, the at least one hardware processor further configured to:
recheck the diversity of data in each dataset after the removing.

15. The system of claim 9, the at least one hardware processor further configured to:
test the trained classifier on a subset of data dedicated for testing.

16. The system of claim 15, wherein the classifier is retrained when a false positive is detected during validation on the subset of data dedicated for testing.

17. A non-transitory computer readable medium storing thereon computer executable instructions for creating a classifier for detecting phishing sites using Document Object Model (DOM) hashes, including instructions for:
parsing each page of one or more pages of the website, wherein the parsing of the page includes at least generating a DOM tree of the page;
for each page of the one or more pages, generating at least one string of DOM tree elements according to one of more predetermined patterns;
for each page of the one or more pages, creating a first hash based on the string of the generated at least one string, and creating a second hash for the page;
generating a first dataset comprising hashes of safe pages and a second dataset comprising hashes of phishing pages, wherein there are similar hashes in the both datasets;
analyzing the first dataset and the second dataset to determine whether there is a diversity of data in each dataset and at least removing hashes from one of the first dataset or the second dataset that have been found in both the first dataset and the second dataset;
generating a training sample from the datasets when there is a diversity of data in each of the first dataset and the second dataset; and
training a classifier of a machine learning model based on the training sample that is generated from the first dataset and the second dataset.

* * * * *